United States Patent [19]

Gruber

[11] 4,143,314

[45] Mar. 6, 1979

[54] CLOSED LOOP SOLAR ARRAY-ION THRUSTER SYSTEM WITH POWER CONTROL CIRCUITRY

[75] Inventor: Robert P. Gruber, North Olmsted, Ohio

[73] Assignee: The United States of America as represented by the Administrator of the National Aeronautics and Space Administration, Washington, D.C.

[21] Appl. No.: 891,370

[22] Filed: Mar. 29, 1978

[51] Int. Cl.² .......................... H02J 7/00; G05F 1/46
[52] U.S. Cl. ........................................ 323/15; 323/20
[58] Field of Search .................. 315/291, 308; 325/15, 325/19, 20

[56] References Cited

U.S. PATENT DOCUMENTS

| | | | |
|---|---|---|---|
| 3,487,291 | 12/1969 | Dowgiallo | 323/15 |
| 3,566,143 | 2/1971 | Cherdak et al. | 307/126 |
| 3,816,804 | 6/1974 | Cardwell | 323/15 X |

Primary Examiner—A. D. Pellinen

Attorney, Agent, or Firm—N. T. Musial; J. R. Manning; G. E. Shook

[57] ABSTRACT

A solar array-ion thruster system including a power control circuit which provides for use of the thruster itself in operating the solar array at the maximum power point. The power control circuit is connected between the solar array and the ion thruster and receives voltage and current signals from the former. The control circuit multiplies the voltage and current signals together to produce a power signal which is differentiated with respect to time. The differentiator output is detected by a zero crossing detector and, after suitable shaping, the detector output is phase compared with a clock in a phase demodulator. An integrator receives no output from the phase demodulator when the operating point is at the maximum power point but is driven toward the maximum power point for non-optimum operation. A ramp generator provides minor variations in the beam current reference signal produced by the integrator in order to obtain the first derivative of power.

6 Claims, 7 Drawing Figures

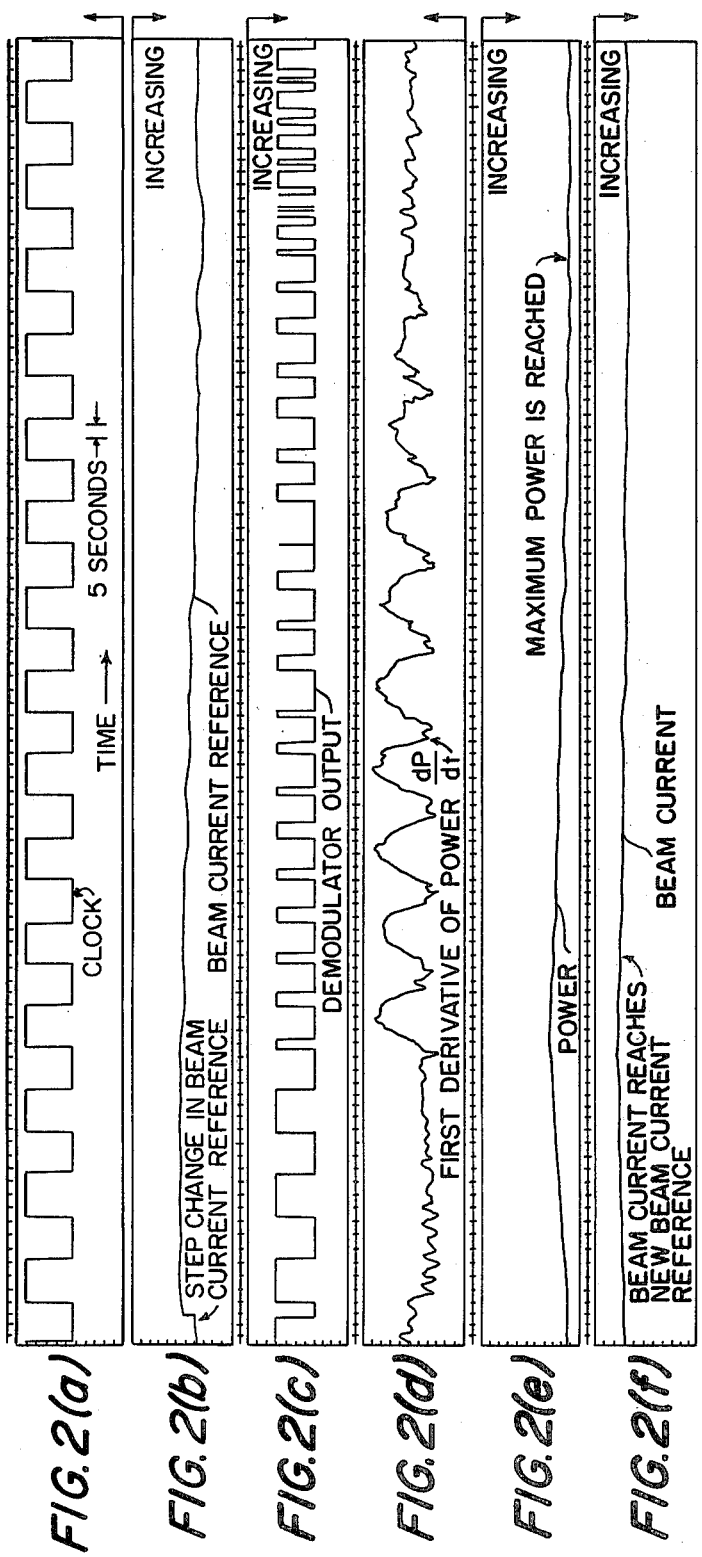

CLOSED LOOP SOLAR ARRAY-ION THRUSTER SYSTEM WITH POWER CONTROL CIRCUITRY

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates to solar array-ion thruster systems and, more particularly, to a power control circuit for such a system which utilizes the ion thruster itself in operating an unregulated solar array at the maximum power point.

BACKGROUND OF THE INVENTION

The application of electron-bombardment ion thruster systems has been analyzed in detail for a broad set of planetary and near earth missions. Reference is made to Atkins, K. L., "Mission Applications of Electric Propulsion", AIAA Paper 74-1085, October 1974; Duxbury, J. H. and Finke, R. C., "A Candidate Mission Using the Shuttle and Solar Electric Propulsion", AAS Paper 75-163, 1975; Guttman, C. H., et al, "The Solar Electric Propulsion Stage Concept for High Energy Missions" AIAA Paper 72-465, April 1972; and Sauer, C. G., Jr., "Trajectory Analysis and Performance for SEP Comet Encke Mission", AIAA Paper 73-1059, October, 1973, for studies dealing with planetary missions and to "Payload Utilization of SEPS", Report D-180-19783-1, Boeing Aerospace Co., 1976; "Concept Definition and Systems Analysis Study for a Solar Electric Propulsion Stage", Report SD74-SA-0176-1, Rockwell International, 1975; and Stearns, J. W., "Large-Payload Earth-Orbit Transportation with Electric Propulsion", (JPL-TM-33-793, Jet Propulsion Lab.; NAS 7-100), NASA CR-148973, 1976 for studies dealing with near earth missions. A further thruster system of interest is the 30-cm diameter mercury bombardment ion thruster presently under development by the Lewis Research Center and discussed in Schnelker, D. E. and Collett, C. R.: "30-cm Engineering Model Thruster Design and Qualification Tests", AIAA Paper 75-341, March, 1975.

As discussed in the mission studies referred to above, ion thrusters are typically powered by solar arrays used in conjunction with power processing equipment. The function of the power processing equipment is to match the thruster load requirements to the solar array. For the high power, high voltage levels encountered with thruster loads, such power processors are heavy, complex, expensive and are a substantial burden to the spacecraft thermal control system. Considerable efforts have been and are being made to develop alternate power processing concepts to reduce these spacecraft penalties.

One of the alternate concepts under consideration is the Integrally Regulated Solar Array (IRSA). The IRSA system provides regulated DC power from a controlled solar array directly to its loads without an intervening power processor. Reference is made to Triner, James E., "A Digital Regulated Solar Array Power Module", NASA TM X-2314, 1971; and Gooder, Suzanne T., "Series-Parallel Method of Direct Solar Array Regulation", NASA TM X-73505, 1976 for a discussion of such a system. An integrally regulated solar array has been used to power a 30-cm ion thruster beam load as described in Gooder, Suzanne T., "Evaluation of 30 cm Ion Thruster Operational Campatibility with Integrally Regulated Solar Array Power Source", NASA TN D-8428, 1977. It has been determined, based on this latter study, that the basic characteristics of solar arrays (such as ripple and the inherent current limited output) are well matched to thruster requirements. To explain, integrally regulated solar arrays typically comprise blocks of cells that are automatically switched in or out by closed loop control so as to provide voltage or current regulation. When this method of regulation is used, the cells that are switched out become dead weight, resulting in a higher subsystem mass to power ratio. Minimization of the solar electric propulsion system mass to power ratio is clearly of primary importance and hence it is desirable that all available solar array power be used. It will, therefore, be appreciated that it is highly desirable to operate the solar array at the maximum power point under all conditions of operation.

Systems capable of operating a solar array at its maximum power point are discussed in Gruber, Robert, "High Efficiency Solar Cell Array Peak Tracker and Battery Charger", IEEE Power Conditioning Specialists Conference, Inst. Electr. Electron Eng., Inc., 1970, pp. 128-138; Paulkovick, John and Rodriguez, G. E., "Maximum Power Transfer by Conductance Comparison", IEEE Power Conditioning Specialists Conference, Inst. Electr. Electron Eng., Inc. 1970, pp. 114-127; and "Advanced Voltage Regulator Techniques as Applied to Maximum Power Point Tracking for the NIMBUS Meteorological Satellite" (AED-R-3221, Radio Corp. of Am.; NAS5-3248), NASA CR-b 93413, 1967. However, these systems suffer the serious disadvantage that batteries are incorporated for energy storage. Optimum solar electric propulsion systems do not use batteries to augment beam power because of the added weight. For most systems without batteries, considerations concerning system dynamics make the implementation of an automatic maximum power point tracker a difficult problem.

Techniques for maintaining a solar array at its maximum power point fall into two categories: (1) open loop and (2) closed loop. Open loop systems measure one or more array parameters and then predict or determine the array maximum power point. Moreover, a system using this technique could include a small reference array. Closed loop techniques determine the location of the maximum power point directly and maintain the system at that point. With open loop techniques it is generally not practicable to accummodate unpredictable changes in solar array output such as those caused by severely degraded cells. Exemplary closed loop systems are disclosed in Gardner, J. A., "Solar Electric Propulsion System Integration Technology (SEPSIT)" Volume 1, Technical Summary, (JPL-TM-33-583-Vol-1, Jet Propulsion Lab.; NAS7-100), NASA CR-13071, 1972; Gardner, J. A., "Solar Electric Propulsion System Integration Technology (SEPSIT)", Volume 2, Encke Rendezvous Missions and Space Vehicle Functional Description, (JPL-TM-33-593-Vol-2, Jep Propulsion Lab., NAS7-100), NASA CR-130702, 1972; and Gardner, J. A., "Solar Electric Propulsion System Integration Technology (SEPSIT)", Volume 3, Supporting Analyses, (JPL-TM-33-583-Vol-3, Jet Propulsion Lab.; NAS7-100), NASA CR-130703, 1972. The closed loop techniques for ion thruster systems disclosed in the referenced studies have been limited in performance because of constraints regarding system dynamics and power dissipation.

Other references of possible interest include the following U.S. Pat. Nos. 3,416,319 (Rubenstein); 3,562,581 (Sonjra); 3,566,143 (Cherdak et al); 3,577,734 (King); 3,626,198 (Boehringer); 3,909,664 (Waskiewicz etal); 3,999,100 (Dendy). The Boehringer patent disclosed an arrangement for maximizing the power output of a solar cell generator, such as found in a satellite, wherein the current and voltage are multiplied together to form a power figure, the current and voltage being varied to locate a desired point on the power curve. The Waskiewicz et al. patent discloses a plasma spraying apparatus where current and voltage are combined to form a power signal which is compared with a power reference to produce a control signal which is used in control of the apparatus. The remaining patents disclose various circuits and systems of interest including solar powered ion thrusters, further control circuits for ion devices and power control circuits for other devices.

SUMMARY OF THE INVENTION

In accordance with the invention, there is provided a power control circuit for a solar array-ion thruster system wherein, in a closed loop system, the beam load of the ion thruster itself is used to automatically and continuously operate an unregulated solar array at the maximum power point thereof, independently of variations in solar array voltage and current. Generally speaking, the thruster beam current is adjusted so that the solar array always operates at the maximum power point, the maximum power point being determined by using the thruster to slightly perturb the array and thus obtain small changes in power. These small power changes are then used to determine the maximum power point in relationship to the actual operating point. The power control circuit then automatically adjusts the thruster beam until the differential of array power is equal to zero. The power control circuit itself is capable of implementation with a small number of physically small signal level components dissipating less than two watts. Moreover, the system of the present invention provides improved performance as compared with other closed loop systems and techniques developed to date.

According to a preferred embodiment, the power control circuit is connected between the solar array and the ion thruster and receives signals from said solar array corresponding to the solar array current and the solar array voltage. The power control system comprises multiplier means for multiplying together the solar array voltage and current signals to produce a power signal, differentiatior means for differentiating the power signal, detector means for determining when the output of the differentiator means lies above and below a predetermined level and for providing an output in accordance therewith, a clock circuit, phase comparator means for comparing the phase of the output of the detector means with the phase of the clock circuit and producing an output in accordance therewith, and integrator means for integrating the output of the phase comparator means over a predetermined time period so as to produce an output signal for controlling the ion thruster. The power control circuit also includes means controlled by the clock circuit for introducing controlled variations on the output signal of the power control circuit so as to ensure that said differentiator means produces an output and thus provides the perturbations of the array referred to above.

The means for introducing controlled variations in the output signal of the power control circuit preferably comprises a ramp generator connected to said clock circuit. A summing amplifier is advantageously connected to the outputs of the integrator means and the ramp generator for producing a beam current reference for controlling the ion thruster. Further, the detector means preferably comprises a zero crossing detector. As will be explained, power is maximized when the first deritive of power with respect to current is zero and while the power control actually provides for setting the first deritive of power with respect to time to zero, it will be shown that this is equivalent to setting the first derivative of power with respect to current to zero. The zero crossing detector, in conjunction with a shaping circuit, provides square wave pulses which are in or out of phase with the clock according to whether the first derivative of power is either positive or negative, respectively. When the operating point is at the maximum power point, the average output of the phase comparator (demodulator) means is zero. On the other hand, when the operating point is not at the maximum power point, the output of the phase demodulator means is non-zero and drives the integrator means, and thus the beam current reference, towards the maximum power point.

Other features and advantages of the invention will be set forth in, or apparent from, the detailed description of the preferred embodiments found hereinbelow.

BRIEF DESCRIPTION OF THE DRAWINGS

FIGS. 2(a) to 2(f) are diagrams showing the waveforms at various locations in the system of FIG. 1 under circumstances wherein a step change has been introduced into the beam current reference.

DESCRIPTION OF THE PREFERRED EMBODIMENTS

Figure 1:
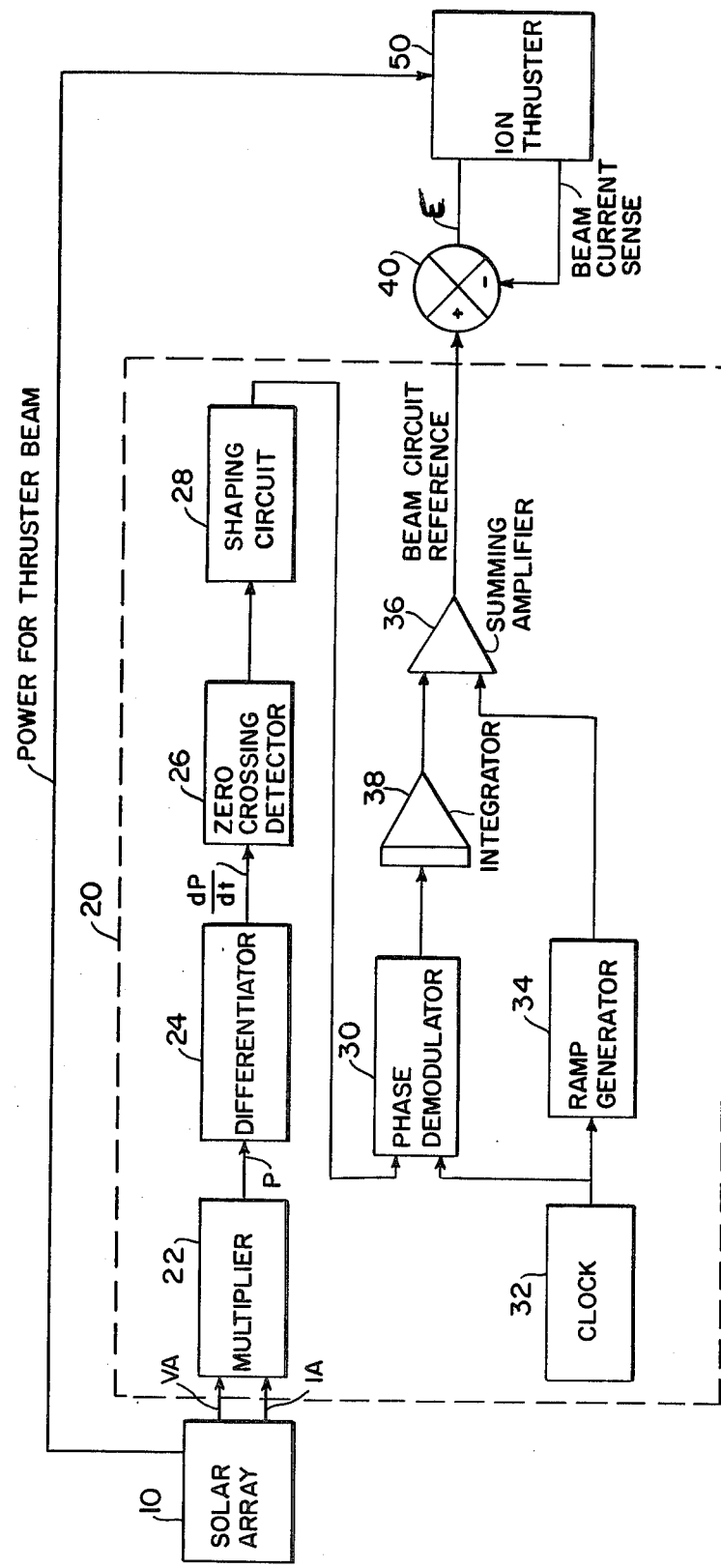
FIG. 1 is a schematic block diagram of a solar array-ion thruster incorporating the power control circuit of the invention.

Referring to the single figure in the drawings, there is shown a block diagram of the solar array maximun power tracking system of the invention. A solar array is indicated schematically by block 10. In an exemplary but essentially arbitrary embodiment, a 700 volt open circuit, 1.2 A short circuit solar array chosen for convenience was assembled from 5 modules in the 1 kilowatt laboratory solar array facility described by Kolecki and Gooder, in "Laboratory 15K V High Voltage Solar Array Facility", NASA TMX-71860 (1976). The facility consists of 9 independent modules, each of which contains an array of 2560 solar cells (2-by 2-cm), a tungsten-iodide lamp bank, infrared filter, and water and air cooling for the cells and lamps respectively. Each module array contains two subpanels of 40 series strings which are 32 solar cells long. Depending on the internal wiring, each module can produce approximately 120 watts at voltage from 12 volts to 1.2 kilovolts. The modules can be interconnected in any series-parallel arrangement. The outputs taken from solar array 10 are the array voltage ($V_A$) and the array current ($I_A$).

Before considering the power tracking or control system of the invention, certain basic considerations regarding ion thrusters will be explored for purposes of background.

The ion thruster indicated at 50 provides thrust by generating, accelerating, and expelling a beam of mercury ions. The energetic ions leaving the thruster 50 are spaced charge neuturalized by electrons from a neutralizer. Basically, liquid mercury is vaporized to provide a controlled propellant flow of mercury atoms into a discharge chamber. Ionization occurs when an atom loses an electron after bombardment by a (40 eV) discharge chamber electron. The electrons and the ions form a plasma in the ionization chamber of the thruster. An electric field between a screen and an accelerator grid in the thruster draws ions from the plasma and accelerates them out through many small holes in the grid set to form an ion beam. The thruster also includes a neutralizer which injects an equal number of electrons into the ion beam.

It should be noted that the electrical load of the ion thruster 50 that requires the most power is the ion beam load. This plasma load typically consumes about ¾ of the total power of thruster 50 at full throttle. The power supplied to the beam is approximately related to thrust as: $T(mN) \cong 2.039 I_B \sqrt{V_B}$, where $T(mN)$ is the thrust, $I_B$ is the beam current and $V_B$ is the beam voltage. Further, the specific impulses, $I_{SP}$, is related to $V_B$ by the formula $I_{SP}(sec) \cong 100 \sqrt{V_B}$. The beam current is controlled by varying the number of neutral mercury atoms flowing to the discharge. This flow rate is determined by the temperature of the porous vaporizer (not shown) which is controlled by a vaporizer heater (not shown) associated with ion thruster 50.

Referring again to the drawings, the power tracker control circuit of the invention, which is generally denoted 20, continuously measures the solar array current $I_A$ and solar array voltage $V_A$ so as to determine array power. To this end, $I_A$ and $V_A$ outputs of solar array 10 are connected to a multiplier 22 whose output corresponds to the power P and is differentiated by a differentiator 24. The output, dP/dt, of differentiator 24 is connected through a zero crossing detector 26 and a shaping circuit 28 to one input of a phase demodulator 30. The other input of phase demodulator 30 is formed by the output of a clock 32. Clock 32 also controls a ramp generator 34 whose output is connected to one input of a summing amplifier 36. The output of phase demodulator 30, after being integrated by an integrator 38, forms the output input to summing amplifier 36.

The output of summing amplifier 36 is a beam current reference signal which is applied to thruster beam current controller in the form of a comparator 40. The comparator 40 receives at the other input thereof a signal representative of the beam current of ion thruster 50 and, responsive to the input signals thereto, generates a control signal, E, for controlling thruster 50.

Considering the operation of the system described above, as stated, solar array voltage and current are continuously measured by power tracking circuit 20 to determine array power. Generally speaking, tracking circuit 20 constantly changes the beam current reference so as to maintain operation of thruster 50 at the maximum power point. As noted above, power is maximized when the first derivative of power with respect to current is equal to zero. Thus, in order to maximize power, differentiator 24 differentiates the power signal P produced by multiplier 22, and the zero crossing detector 26 determines when the output of differentiator 24, which corresponds to the first derivative of the power P, crosses zero. At the time the first derivative of power with respect to current is equal to zero, the array voltage-current characteristic must be virtually constant. Circuit 20, through the action of differentiator 24, generates the first derivative of power with respect to time by varying array circuit. However, setting dP/dt equal to zero is the equivalent to setting dP/dI equal to zero, as is shown by the following equations:

$$\frac{dP}{dt} = \left(\frac{\delta P}{\delta I_A}\right)\frac{dI_A}{dt} + \left(\frac{\delta P}{\delta V_A}\right)\frac{dV_A}{dt} = 0$$

and $$\frac{dV_A}{dt} = \frac{dV_A}{dI_A} \times \frac{dI_A}{dt}$$

so, $$DP = \left(\frac{\delta P}{\delta I_A}\right)dI_A + \left(\frac{\delta P}{\delta V_A}\right)\left(\frac{dV_A}{dI_A}\right)dI_A = 0$$

Therefore, $$\frac{dP}{dI} = \left(\frac{\delta P}{\delta I_A}\right) + \left(\frac{\delta P}{\delta V_A}\right)\left(\frac{dV_A}{dI_A}\right) = 0$$

In order to be able to obtain the first derivative of power with respect to time, the thruster beam current is perturbed by an amount on the order of 5 percent peak to peak using clock 32 and associated ramp generator 34, with the actual amount of current perturbation being adjustable. Thus, array power, the first derivative of array power and array current changes are all phase related to the signal produced by clock 32.

The phase of the first derivative relative to the clock is determined by the location of the thruster beam current operating point on the array characteristic. If the signal corresponding to the first derivative of power is positive with increasing current (meaning that the operating point is on the low current side of the maximum power point) the signal is in phase with the clock. If the first derivative of power is negative with increasing current (meaning that the operating point is on the high current side of the maximum power point) the signal is out of phase with the clock by 180°. When the operating point is on the maximum power point the average of the first derivative of power is zero.

Zero crossing detector 26, shaping circuit 28 and phase demodulator 30 are used to determine the phase relationship between the first derivative of array power and the clock for a positive, negative or zero first derivative. The zero crossing detector 26 and shaping circuit 28 provide a square pulse which is in or out of phase with the clock pulses produced by clock 32 according to whether the sign of the first derivative of power is either positive or negative, respectively. As noted, phase demodulator 30 receives the outputs of shaping circuit 28 and clock 32, and the output of phase demodulator 30 is positive for in phase inputs, negative for out of phase inputs and average zero at the maximum power point. To explain, when the operating point is at the maximum power point, the first derivative of power changes sign twice for each half cycle of the clock frequency. This results in an average output of zero from phase demodulator 30. Moreover, since the input to integrator 38 is thus averaging zero under this circumstance, the output of integrator 38 does not change. In this maximum power condition, the array/thruster operating point is not changed. On the other hand, when the operating point is not at the maximum power point, the output of phase demodulator 30 drives the integrator 38, and thus the beam current reference signal, towards the maximum power point.

Testing has been carried out using a 30-cm diameter electron bombardment mercury ion thruster, an unregulated solar array, a conventional power processor and a maximum power control circuit constructed in accordance with the invention. The system was arranged so that the thruster can be initially operated exclusively from the power processor with switches being used to replace the power processor beam supply with the solar array and to replace the fixed beam current reference with the power tracker beam current reference described above in connection with FIG. 1. The thruster utilized during the testing was a so-called "400 series" thruster that was originally built by Hughes Research Laboratories and was modified at the NASA Lewis Research Center to be essentially equivalent to a 700 series Engineering Model Thruster (EMT) described in Sovey, J. S., and King, H. J., "Status of 30-cm Mercury Ion Thruster Development", AIAA Paper 74-1117, October, 1974. These modifications included the neutralizer assembly, dished grids of the EMT geometry, an "800 series" main, and cathode-isolator-vaporizers, an increased magnetic field and a 10½ turn magnetic baffle. The solar array was that described above.

A transistor bridge converter test console corresponding to that described in Collett, C., "Thruster Endurance Test" (Hughes Research Labs.; NAS3-15523), NASA Cr-135011, 1976, was used for the testing referred to. Although this unit is a laboratory test console, it incorporates all the controls necessary for closed-loop thruster operation and is functionally representative of a flight type power processor. The converters supplying the accelerator and discharge load operate at a switching frequency of approximately 10 kHz. The converters supplying the remaining thruster loads operate at 5 kHz. In order to use the thruster beam current controller to track maximum array power, the fixed beam current reference voltage was simply replaced by the maximum power tracking control circuit output reference.

Considering the testing procedure in more detail, preliminary systems test were conducted for the purpose of determining concept feasibility. For convenience, the thruster was started and operated with the conventional power processor. As mentioned above, after stable thruster operation was achieved, the beam supply was switched over from the conventional supply to the unregulated solar array. In addition, the fixed beam current reference was switched to the maximum power tracker control circuit output reference. When maximum power operation was achieved, dynamic tests were run in which the beam reference signal (the output of summing amplifier 36), and therefore array current, was reduced by resetting the integrator (corresponding to integrator 38) in the maximum power tracker control circuit 20. Closed loop maximum power tracking was demonstrated with a 700 volt open circuit, 1.2A short circuit current solar array supplying power for the thruster beam, the array corresponding to that described above. Automatic maximum power tracking was established and maintained for a step change in the beam current reference.

Referring to FIGS. 2(a) to 2(f), system parameter changes caused by providing a step change in the beam current reference are illustrated. The showing in FIGS. 2(a) to 2(f) are taken directly from actual chart readouts and several of the figures are "upside down" as normally viewed. Arrows have been provided to indicate the direction of "increase" and the upside down figures (2(b), 2(c), 2(e) and 2(f) are suitably marked. As indicated, FIG. 2(a) shows the output waveform of clock 32; FIG. 2(b) shows the beam current reference signal with the step change therein corresponding to that mentioned above; FIG. 2(c) shows the output of phase demodulator 30; FIG. 2(d) shows the output signal dP/dt of differentiator 24; FIG. 2(e) shows the power output P; and FIG. 2(f) shows the beam current. The initial operating conditions is steady state operation at the maximum power point. The step reference change shown in FIG. 2(b) was introduced by rapidly resetting integrator 38 as described previously. At this time the main vaporizer in thruster 50 turns "full off" in response to the new lower reference. The power tracker circuit 20 now has no effect because the array current perturbing signal is cut off by this non-linear condition. After about two minutes the thruster beam current reaches the new beam current reference and the power tracker circuit 20 begins to regain control. During this time the beam current reference stays constant. When the beam current reaches the reference point shown, it is evident from the increasing beam current shown in FIG. 2(f), the increasing power shown in FIG. 2(e) and increasing beam current reference shown in FIG. 2(b), that the controller 20 is starting to drive towards the maximum power point. It is also seen from FIG. 2(c) that the output phase demodulator 30 averages a positive value. This positive value continues to drive the integrator 38 towards the maximum power point. Furthermore, the first derivative, shown in FIG. 2(d), is essentially in phase with the clock until the maximum power point is again reached. The power versus time waveform of FIG. 2(e) shows that the power recovers to its maximum after a step change in the beam current reference.

It is noted that techniques of maximum power tracking disclosed above can also be used with a power converter connected between the array and the thruster.

Although the invention has been described relative to exemplary embodiments thereof, it will be understood that other variations and modifications can be effected in these embodiments without departing from the scope and spirit of the invention.

I claim:

1. A power control circuit for a solar array ion thruster system wherein the ion thruster beam current is controlled so as to operate the solar array at the maximum power point, said power control circuit being connected between the solar array and the ion thruster and receiving signals from said solar array corresponding to the solar array current and the solar array voltage, said power control system comprising multiplier means for multiplying together said solar array voltage signal and said solar array current signal to produce a power signal, differentiation means for differentiating said power signal, detector means for determining when the output of said differentiator means lies above and below a predetermined level and for providing an output in accordance therewith, a clock circuit, phase comparator means for comparing the phase of the output of said detector means with the phase of said clock circuit and producing an output in accordance therewith, integrator means for integrating the output of said phase comparator means over a predetermined time period so as to produce an output signal for controlling the ion thruster, and means controlled by said clock circuit for introducing controlled variations on the output signal of the power control circuit so as to ensure that said differentiator means produces an output.

2. A power control circuit as claimed in claim 1 wherein said means for introducing controlled variations in the output signal of the power control circuit comprises a ramp generator connected to said clock circuit.

3. A power control circuit as claimed in claim 2 further comprising a summing amplifier connected to the output of said integrator means and said ramp generator for producing a beam current reference for controlling the ion thruster.

4. A power control circuit as claimed in claim 1 wherein said detector means comprises a zero crossing detector.

5. A power control circuit as claimed in claim 4 further comprising a shaping circuit connected between said zero crossing detector and said phase comparator means.

6. A power control circuit as claimed in claim 3 wherein said detector means comprises a zero crossing detector.

* * * * *